United States Patent [19]

Chow et al.

[11] Patent Number: 5,179,911
[45] Date of Patent: Jan. 19, 1993

[54] AQUARIUM HAVING A CLEANING APPARATUS

[76] Inventors: Hong-Jien Chow, 4th Fl., No. 5, Chingcheng Wu St., Taichung city; Yi-Min Jian, No. 5, Tali Rd., Sijung Village, Tali Hsiang, Taichung County, both of Taiwan

[21] Appl. No.: 868,857
[22] Filed: Apr. 16, 1992
[51] Int. Cl.5 .................... A01K 63/00; A01K 63/04
[52] U.S. Cl. ......................... 119/5; 210/169
[58] Field of Search ............... 119/3, 5, 2; 210/169, 210/416.2

[56] References Cited

U.S. PATENT DOCUMENTS

| | | | |
|---|---|---|---|
| 4,957,623 | 9/1990 | Henzlik | 119/5 |
| 4,978,444 | 12/1990 | Rommel | 119/5 |
| 5,006,394 | 11/1991 | Harrison | 119/5 |
| 5,054,424 | 10/1991 | Sy | 119/5 |
| 5,062,951 | 11/1991 | Towinaga | 119/5 |

FOREIGN PATENT DOCUMENTS 2612739  9/1988  France ..................... 119/5

Primary Examiner—John G. Weiss
Attorney, Agent, or Firm—Beveridge, DeGrandi, Weilacher & Young

[57] ABSTRACT

An aquarium including a tank disposed above a housing, a screen disposed in the housing, a space formed below the screen, a conduit coupling the tank to the housing for supplying water from the tank to the housing and to the space, an outer tube vertically disposed in the housing and an inner tube disposed in the outer tube and having a lower end extended outward of the housing. The water contained in the space is forced to flow into the outer tube and to flow out of the housing via the inner tube when water is supplied into the housing and the space from the tank.

7 Claims, 5 Drawing Sheets

AQUARIUM HAVING A CLEANING APPARATUS

BACKGROUND OF THE INVENTION

1. Field of the Invention

The present invention relates to an aquarium apparatus, and more particularly to an aquarium having a flush type cleaning apparatus.

2. Description of the Prior Art

Feeding fish has become more and more popular recently; however, cleaning the aquarium has become a bad headache for the feeders and raisers. People who don't know how to clean the aquarium may discharge all of the water contained in the aquarium, and clean the aquarium, and replenish the aquarium completely with fresh water which may have different temperatures and "pH" values and may contain chloric materials, such that the fish can not accommodate themselves to such a different and changing environment right away and such that the fish will easily die. The feeder doesn't even know why the fish will die.

One type of aquarium is disclosed in U.S. Patent No. 4,913,811 to Huang et al., filed Mar. 13, 1989, entitled "CLEANER FOR AQUARIUM". In this aquarium, a rotary brush is required to clean the impurities deposited in the bottom of the aquarium. The configuration thereof is complicated such that the aquarium has a high manufacturing cost.

The present invention has arisen to mitigate and/or obviate the afore-described disadvantages of the conventional cleaning devices for aquarium.

SUMMARY OF THE INVENTION

The primary objective of the present invention is to provide an aquarium having a cleaning apparatus for flushing and cleaning the bottom portion of the aquarium.

In accordance with one aspect of the invention, there is provided an aquarium comprising a housing, a screen disposed on a lower portion of the housing so that a space is formed below the screen, a tank for containing water, a conduit coupling the tank to the housing and including a first mouth communicated with the space and a second mouth communicated with the housing for supplying the water from the tank to the housing and to the space respectively, an outer tube vertically disposed in the housing distal from the conduit and including a lower end communicated with the space, and an inner tube disposed in the outer tube and including a lower end extended outward of the housing and an open upper end; whereby, the water contained in the space is forced to flow into the outer tube and to flow out of the housing via the open upper end of the inner tube when water is supplied into the housing and the space from the tank.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
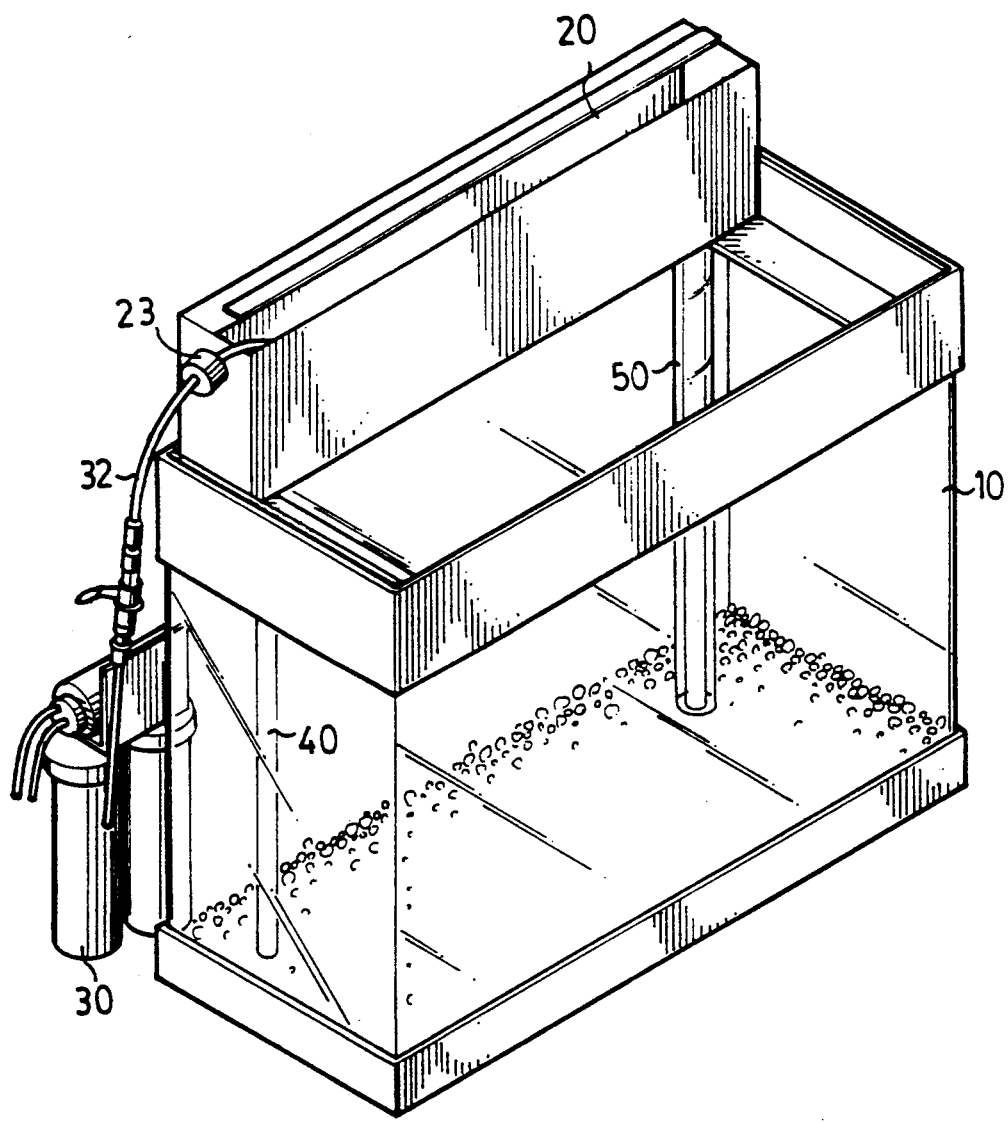
FIG. 1 is a perspective view of an aquarium in accordance with the present invention.

Referring to the drawings, and initially to FIG. 1, an aquarium in accordance with the present invention comprises generally a housing 10, a tank 20 for containing water, means 30 for filtering the water supplied into the tank 20 via the hose 32, means 40 for supplying water from the tank 20 into the housing 10 and into the bottom portion of the housing 10, and means 50 for discharging water.

Figure 2:
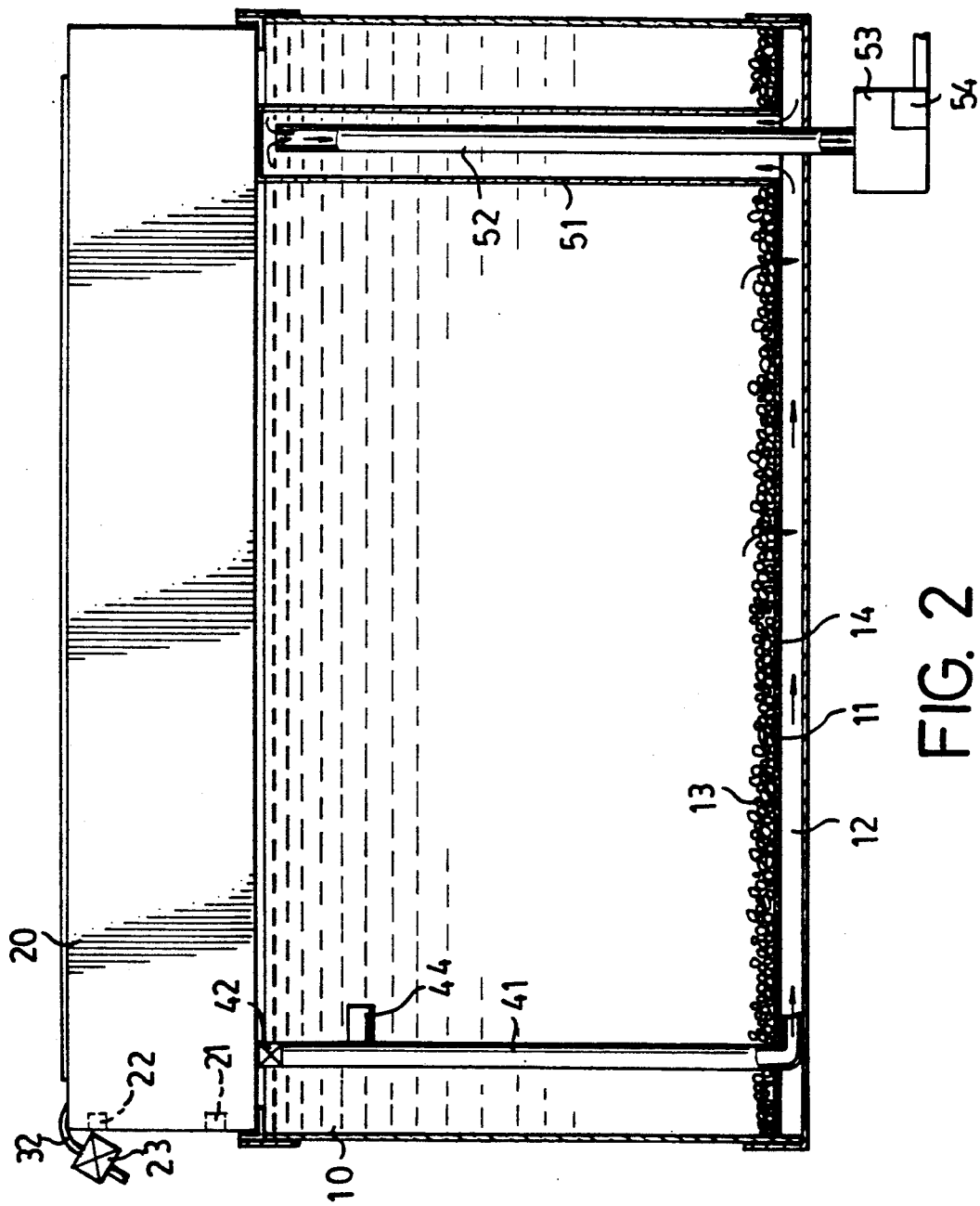
FIG. 2 is a schematic view of the aquarium.
Figure 3:
FIG. 3 is a schematic view illustrating the bottom portion of the aquarium.

Referring next to FIGS. 2 and 3, the housing 10 includes a screen 11 disposed in the bottom portion thereof for supporting stones 13 and arranged such that a space 12 is formed below the screen 11. The screen 11 includes a plurality of openings 14 formed therein and arranged such that the impurities and the excretion of the fish will pass therethrough and tend to be collected within the space 12.

The means 40 for supplying water from the tank 20 into the housing 10 and into the bottom portion of the housing 10 includes a conduit 41 having one end coupled to the first end portion of the tank 20 and having the other end extended into the space 12 so as to supply water from the tank 20 to the space 12 in order to flush the impurities deposited in the space 12, a valve 42, such as a solenoid valve, disposed in the upper end of the conduit 41 for controlling the water flowing through the conduit 41, and a mouth 44 formed in the upper portion of the conduit 41 for supplying water into the housing 10. As shown in FIG. 3, an L-shaped extension 46 is coupled to the conduit 41 and includes two legs preferably disposed in parallel to two side edges of the housing 10, the extension 46 has a plurality of holes 47 formed therein and preferably directed toward the discharging means 50 such that the water ejected from the extension 46 tends to cause the water flow toward the discharging means 50.

A first sensor 21 and a second sensor 22 are disposed in the lower portion and the upper portion of the tank 20 respectively. A valve, such as a solenoid valve 23, is disposed in the hose 32 which is provided for supplying filtered water into the tank 20, in order to control the water supply into the tank 20. For example, the solenoid valve 23 is opened when the water level of the tank 20 is lowered to the level of the sensor 21 and is closed when the water level of the tank 20 reaches the level of the sensor 22. The solenoid valve 42 is coupled to a timer (not shown) and arranged such that the water will flow into the housing 10 and the space 12 via the valve 42 at a predetermined time interval ranging from 3 hours to 12 hours. It is preferable that the solenoid valve 42 can also be controlled manually. It is preferable that the water volume of the tank 20 ranges from 1/10 to ¼ of the volume of the housing 10, such that only part of the water contained within the housing 10 is replaced at one time.

The means 50 for discharging water includes an outer tube 51 vertically disposed on one corner area of the housing 10 distal from the extension 47, and an inner tube 52 disposed in the outer tube 51. The outer tube 51 includes an enclosed upper end and a lower end coupled to the screen 11 and communicated with the space 12 such that the water accommodated in the space 12 and the impurities contained therein tend to be caused to flow into the outer tube 51 when water is supplied into the space 12. The inner tube 52 includes a lower end extended downward and outward of the housing 10 and preferably coupled to a container 53 for collecting the waste water, and an open upper end arranged such that the water may flow into the inner tube 52. It is to be noted that the water will flow into the inner tube 52 when the water level of the housing 10 is higher than the open upper end of the inner tube 52 such that the open upper end of the inner tube 52 determines the water level of the housing 10. A drowned neeic pump 54, for example, is disposed in the container 5 for discharging the waste water contained in the container 53.

It is to be noted that the water flowing out from the mouth 44 facilitates the water circulation in the housing 10 which has a tendency to force the impurities to move downward through the screen 11 and into the space 12. The impurities further tend to be deposited in the space by the water pressure.

Figure 4:
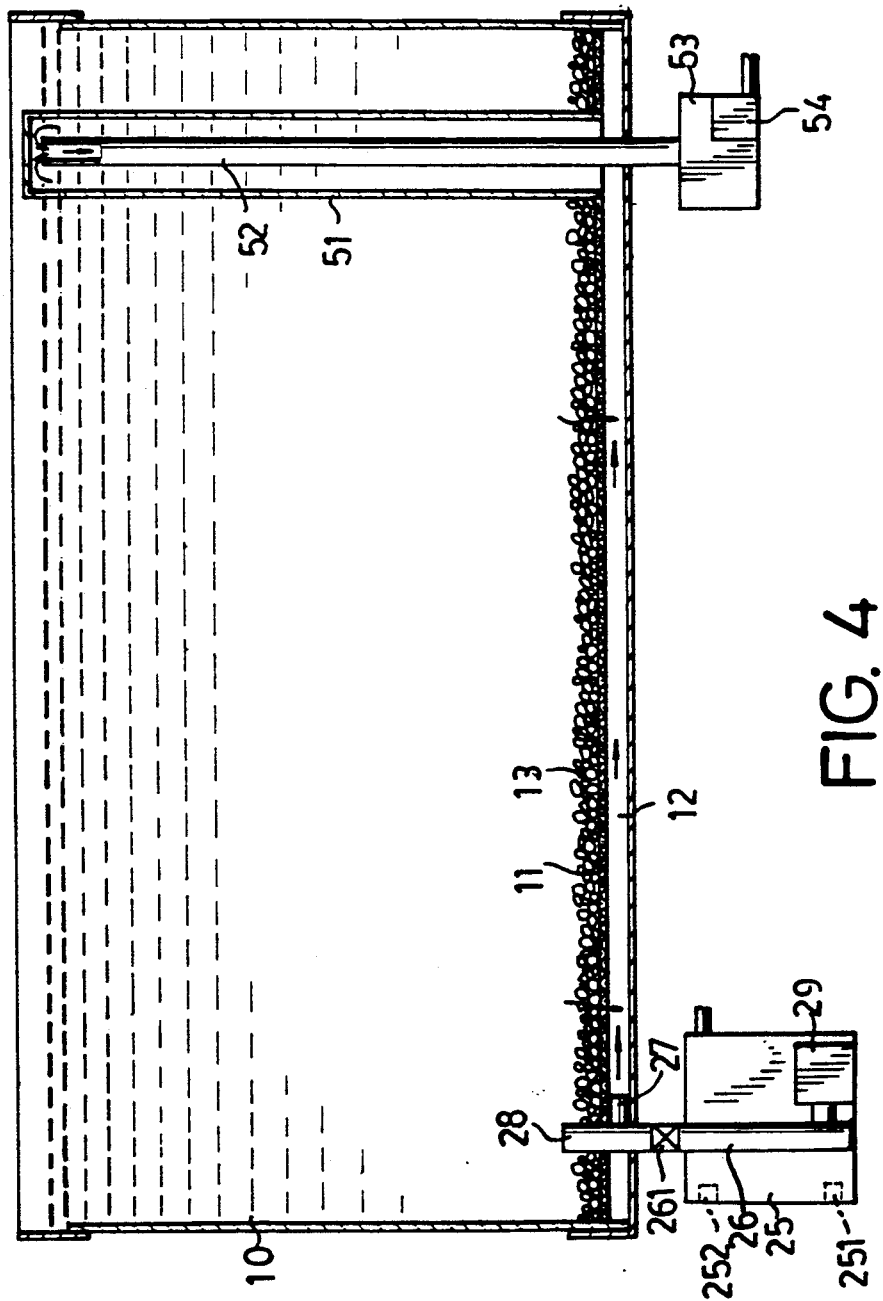
FIG. 4 is a schematic view illustrating another type of draining device.

Referring next to FIG. 4, instead of disposing above the housing 10, a tank 25 is disposed below the housing 10, a hose 26 couples the tank 25 to the housing 10 and includes a mouth 27 communicated to the space 12 and another mouth 28 communicated to the housing 10. A check valve 261 is disposed in the hose 26 for preventing backward flowing of the water. A pump 29, such as a drowned neeic pump, is disposed in the tank 25 for pumping water into the housing 10 and can be actuated at a predetermined time interval. Two sensors 251, 252 are disposed in the tank 25 for controlling the operations of the pump 29.

Figure 5:
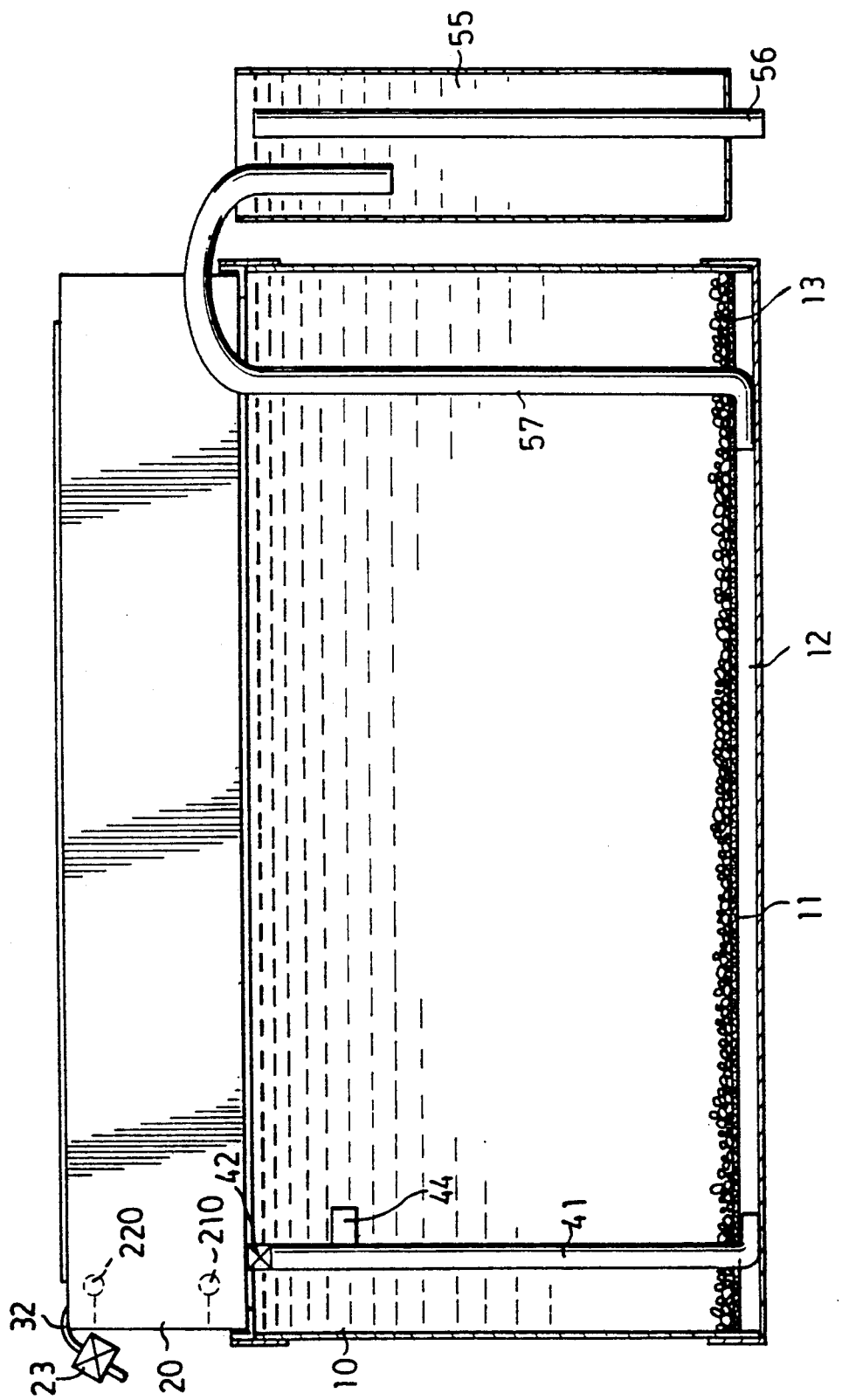
FIG. 5 is a schematic view illustrating another type of water supplying system.

Referring next to FIG. 5, instead of the outer tube 51 and the inner tube 52, a casing 55 is disposed either inside or outside of the housing 10, a duct 56 is disposed in the casing 55 and has a lower end extended outward of the casing 55, and a pipe 57 has one end communicated to the space 12 and has the other end connected to the casing 55 such that the waste water contained in the space 12 can be caused to flow into the casing 55. The duct 56 includes an open upper end which determines the water level of the housing 10. The sensors 210, 220 are, for example, the float type sensors, as shown in FIG. 5.

Accordingly, the water contained in the aquarium can partly be replaced with fresh water at a suitable time interval. The aquarium need not be completely replenished with fresh water and can be easily cleaned. In addition, the aquarium has a simple construction such that the manufacturing cost is greatly reduced.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An aquarium comprising a housing, a screen disposed on a lower portion of said housing so that a space is formed below said screen, a tank for containing water, a conduit coupling said tank to said housing and including a first mouth communicated with said space and a second mouth communicated with said housing for supplying said water from said tank to said housing and to said space respectively, an outer tube vertically disposed in said housing distal from said conduit and including a lower end communicated with said space, and an inner tube disposed in said outer tube and including a lower end extended outward of said housing and an open upper end; whereby, said water contained in said space is forced to flow into said outer tube and to flow out of said housing via said open upper end of said inner tube when water is supplied into said housing and said space from said tank.

2. An aquarium according to claim 1, wherein said tank is disposed above said housing and includes a first valve disposed between said tank and said conduit for controlling flow of said water to said conduit, a hose coupled to said tank for supplying water to said tank, a second valve disposed in said hose for controlling flow of said water into said tank, a first sensor disposed in a lower portion thereof for sensing a lower water level of said tank and a second sensor disposed in an upper portion thereof for sensing an upper water level of said tank.

3. An aquarium according to claim 1 further comprising an extension disposed in said space and coupled to said conduit and including a plurality of holes formed therein and arranged such that said water is caused to flow toward said outer tube.

4. An aquarium according to claim 3, wherein said extension is substantially L-shaped including two legs disposed in parallel to two side edges of said housing.

5. An aquarium according to claim 1, wherein said tank is disposed below said housing, a check valve is disposed in said conduit for preventing the backward flow of said water, and a pump is coupled to said conduit for pumping said water contained in said tank to said housing and said space.

6. An aquarium comprising a housing, a screen disposed on a lower portion of said housing so that a space is formed below said screen, a tank for containing water, a conduit coupling said tank to said housing and including a first mouth communicated with said space and a second mouth communicated with said housing for supplying said water from said tank to said housing and to said space respectively, a casing coupled to said housing, a pipe including a first end communicated with said space and a second end communicated with said casing, a duct vertically disposed in said casing and including a lower end extended outward of said casing and an open upper end; whereby, said water contained in said space is forced to flow into said casing and to flow out of said casing via said open upper end of said duct when water is supplied into said housing and said space from said tank.

7. An aquarium according to claim 6, wherein said tank is disposed above said housing and includes a first valve disposed between tank and said conduit for controlling flow of said water to said conduit, a hose coupled to said tank for supplying water to said tank, a second valve disposed in said hose for controlling flow of said water into said tank, a first sensor disposed in a lower portion thereof for sensing a lower water level of said tank and a second sensor disposed in an upper portion thereof for sensing an upper water level of said tank.

* * * * *